United States Patent [19]

Lavieville et al.

[11] Patent Number: 5,668,711
[45] Date of Patent: Sep. 16, 1997

[54] ELECTRONIC CIRCUIT FOR CONVERTING ELECTRICAL ENERGY, AND A POWER SUPPLY INSTALLATION MAKING USE THEREOF

[75] Inventors: Jean-Paul Lavieville, Gif sur Yvette; Philippe Carrere; Thierry Meynard, both of Toulouse, all of France

[73] Assignee: Gec Alsthom Transport SA, Paris, France

[21] Appl. No.: 676,393
[22] PCT Filed: Dec. 28, 1995
[86] PCT No.: PCT/FR95/01748
§ 371 Date: Jul. 23, 1996
§ 102(e) Date: Jul. 23, 1996
[87] PCT Pub. No.: WO96/21267
PCT Pub. Date: Jul. 11, 1996

[30] Foreign Application Priority Data

Dec. 29, 1994 [FR] France .................. 94 15864

[51] Int. Cl.⁶ ............... H02M 3/06; H02M 3/18
[52] U.S. Cl. ......................... 363/62; 307/110
[58] Field of Search ............. 363/59, 60, 62; 327/536; 307/109, 110

[56] References Cited

U.S. PATENT DOCUMENTS

| | | | |
|---|---|---|---|
| 5,029,282 | 7/1991 | Ito ........................ | 307/296.8 |
| 5,095,223 | 3/1992 | Thomas ................. | 307/110 |
| 5,345,376 | 9/1994 | Nourbakhsh .......... | 363/62 |
| 5,491,623 | 2/1996 | Jansen .................. | 363/60 |
| 5,532,916 | 7/1996 | Tamagawa ............ | 363/62 |
| 5,568,035 | 10/1996 | Kato et al. ............ | 307/110 |

FOREIGN PATENT DOCUMENTS

2679715A1  1/1993  France .

*Primary Examiner*—Peter S. Wong
*Assistant Examiner*—Bao Q. Vu
*Attorney, Agent, or Firm*—Sughrue, Mion, Zinn, Macpeak & Seas

[57] ABSTRACT

A multilevel converter including, in particular, a capacitor (C1, C2, ..., Cn) for each of its cells. The capacitors have nominal charge voltages proportional to their respective ranks in the converter. It also includes control means (BT, DA1, ..., DAn, pe2, ..., pen) organized to evaluate said voltage of the voltage source (VECn), and whenever it is insufficient, to suspend said nominal operation of the converter (SE) and to act on said switches (T1, T'1; T2; T'2; ...; Tn, T'n) in such a manner that initially, while said voltage of the voltage source is being established, it begins by charging all of the capacitors of the converter (C1, C2, ..., Cn), after which said control means establish said nominal operation of the converter.

3 Claims, 2 Drawing Sheets

ELECTRONIC CIRCUIT FOR CONVERTING ELECTRICAL ENERGY, AND A POWER SUPPLY INSTALLATION MAKING USE THEREOF

BACKGROUND OF THE INVENTION

The present invention relates to electronic circuits for converting electrical energy of the type described in French application FR 2 679 715 A1, and to a power supply installation making use thereof.

The converter described in that patent application is shown, by way of example, in accompanying FIG. 1. It essentially comprises, between a voltage source SE and a current source C, a succession of controllable switching cells CL1, CL2, ..., CLn, each having two switches T1, T'1; T2, T'2; ... ; Tn, T'n, with one pole of each of the two switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell CL1 being connected to said current source C, while the pair of downstream poles of a last cell CLn is connected to said voltage source SE, the converter also comprising a respective capacitor C1, C2, ..., Cn for each cell, except that the capacitor of the last cell may be omitted when said voltage source SE is suitable for performing the same role, each capacitor is connected between the two poles constituting the pair of downstream poles of its cell, the converter further having control means (not shown) governing the nominal operation of the converter and acting on the switches of the successive cells in such a manner that the two switches of any one cell are always in respective opposite conduction states (represented by control links such as lc1), such that in response to a cell control signal delivered by said control means, one of the two switches in a given cell is successively in a first conduction state and then in a second conduction state during a cyclically repeated converter period, and such that in response to cell control signals that are identical but offset in time by a fraction of said converter period, the switches of successive cells function respectively in the same manner but offset in time by said fraction of a period.

Preferably, said fraction of a period is equal to the reciprocal of the number $n$ of cells, i.e. $2\pi/n$, which is optimal with respect to harmonics generated on the output and which enables the voltages charged on the capacitors of the converter to be balanced naturally. Some other offset is nevertheless conceivable.

In such a converter, the successive capacitors C1, C2, ..., Cn have respective increasing mean charge voltages, the mean charge voltage of the capacitor associated with each of said cells being equal to the product of a voltage VE delivered by said voltage source SE multiplied by the reciprocal of the number of cells in the converter and by the rank of the cell, i.e. VE/3, 2VE/3, VE when n=3, i.e. when the converter has only three cells.

The term "multilevel converter" is used below to designate a converter that satisfies the above description.

The advantage of such a converter is that in normal operation each of said switches is subjected only to a fraction of the maximum voltage to which the converter is subjected, i.e. to the fraction which corresponds to the difference between the charge voltages of the two capacitors of two adjacent cells. It is thus possible for said interrupters to be embodied by components that are cheaper and/or faster; if they are faster, then it is possible to make a converter whose operating frequency is higher, and that is most advantageous in practice.

OBJECTS AND SUMMARY OF THE INVENTION

The object of the present invention is to ensure that said capacitors acquire their respective said nominal charge voltages quickly, as soon as said voltage source powers the converter.

The way in which the converter operates is such that if the nominal charge voltage of a capacitor is higher than it ought to be, then it delivers extra current to the current source, thereby tending to bring its charge voltage back to the nominal value. Nevertheless, the process is relatively slow, particularly when the current flowing through the current source is small. When applied to conditions where said voltage source is initially inactive and then suddenly establishes the feed voltage of the converter, that has the effect that the switches are subjected to abnormally high voltages for a relatively long period of time.

It is nevertheless important, both under such conditions and in normal operation, to avoid subjecting the switches to excessive voltages, even temporarily, since that could damage them.

According to the invention, the above object is achieved in that the converter comprises control means organized to evaluate said voltage of the voltage source of the converter and as soon as it is less than a determined threshold, to suspend said nominal operation of the converter and to act on said switches in such a manner that while said voltage of the voltage source has a value lying between zero and a lowest one of said nominal charge voltages, it charges all of the capacitors of the converter, while said voltage of the voltage source exceeds said lowest nominal charge voltage the capacitor nominally charged to said voltage is taken out of circuit and said voltage of the voltage source continues to charge the capacitors requiring higher nominal charge voltages, while the voltage of the voltage source exceeds the immediately higher nominal charge voltage the capacitor nominally charged to said voltage is in turn taken out of circuit, with the voltage of the voltage source continuing to charge the other capacitors, and so on, until all of the capacitors of the converter are charged to their respective nominal charge voltages, after which said control means establish said nominal operation of the converter.

In an embodiment of the converter, said control means act on said switches so that for a voltage of the voltage source that is increasing from zero, both switches are initially closed simultaneously in all of the cells, with the exception of the switches of the first cell which are in another state such that the voltage delivered to said load is zero, after which, as said voltage of the voltage source rises, the pairs of switches of successive following cells are put into said other state, cell after cell.

The invention also provides an installation making use of such a converter and that it is organized, where necessary, so that said establishment of the voltage of the voltage source takes place progressively in a manner appropriate to the converter used.

BRIEF DESCRIPTION OF THE DRAWINGS

The various objects and characteristics of the present invention appear more clearly from the following description of implementations of the invention given by way of non-limiting example and made with reference to the accompanying figures, in which.

DETAILED DESCRIPTION OF THE INVENTION

A multilevel converter is not described again. The diagram of FIG. 1 corresponds to a converter of the type described in patent document FR 2 697 715 A1 to which the reader is referred for more ample details.

Figure 1:
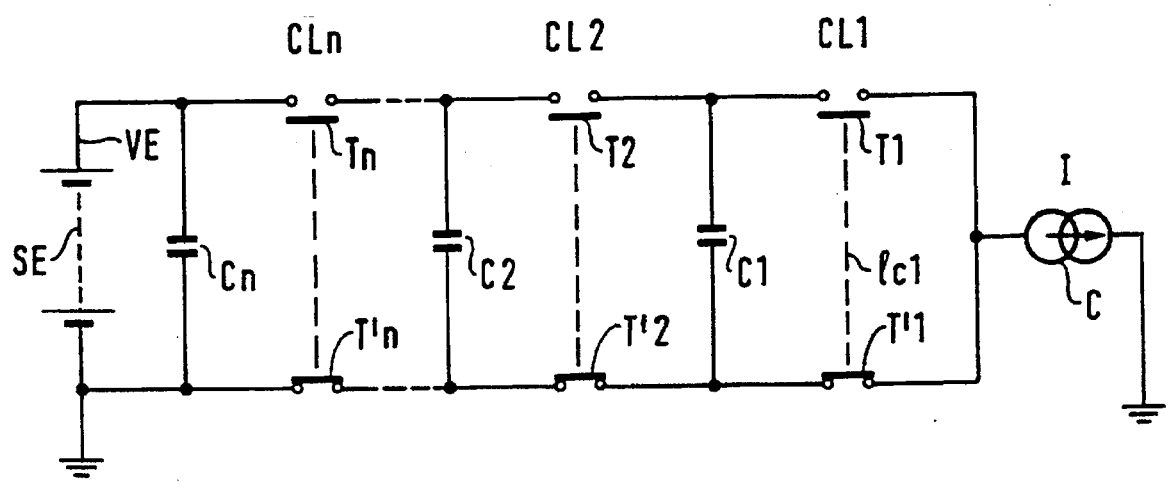
FIG. 1, described above, is the circuit diagram of a known multilevel converter.
Figure 2:
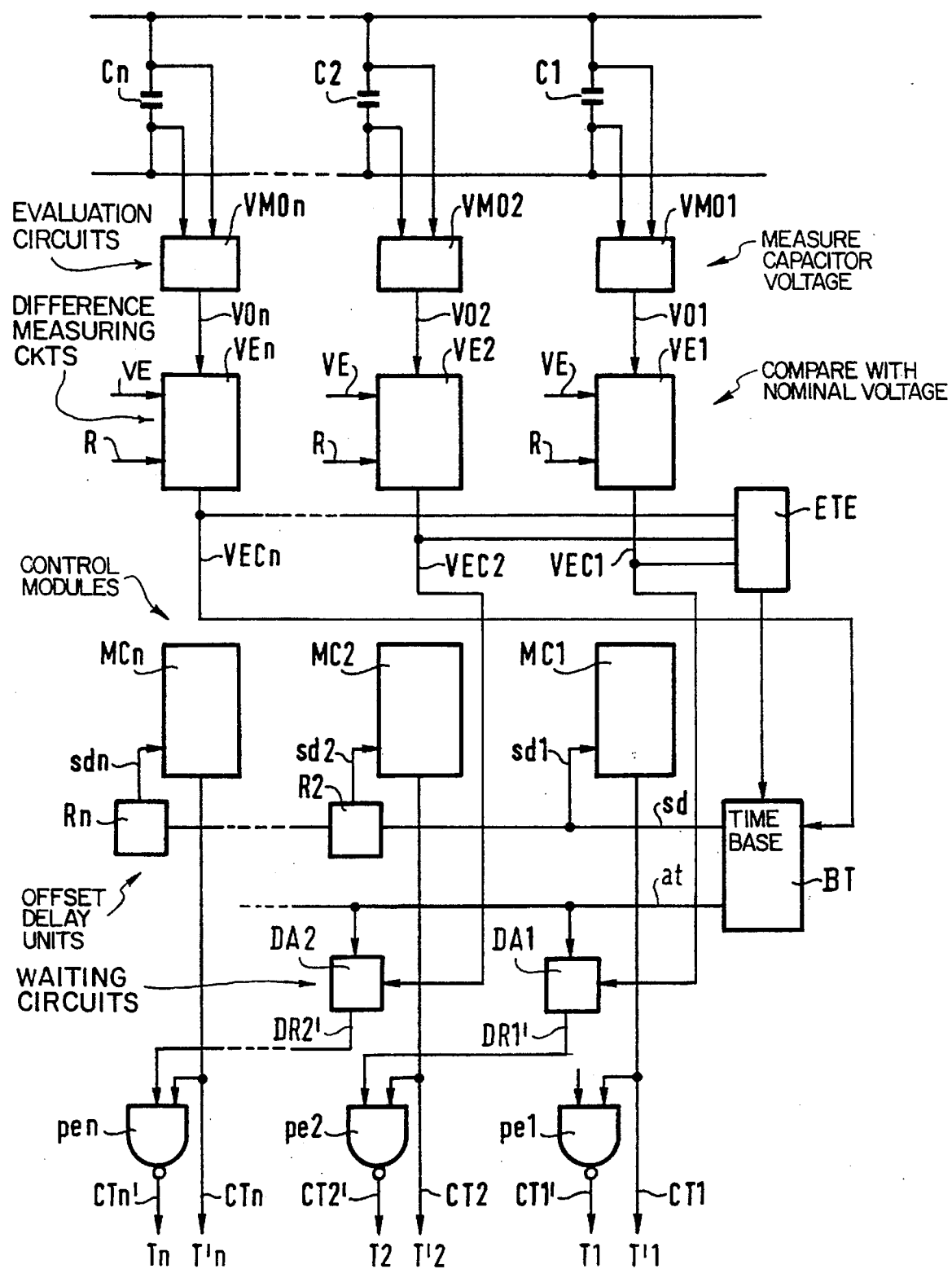
FIG. 2, is the circuit diagram of control means for a multilevel converter of the FIG. 1 type and organized to enable the invention to be implemented.

In FIG. 2, only the capacitors C1, C2, ..., Cn of the FIG. 1 converter are shown.

According to the invention, each of these capacitors is associated with a respective evaluation circuit VMO1, VMO2, ..., VMOn enabling the voltage across the terminals of each of the capacitors to be evaluated. To this end, each such circuit is coupled to the two terminals of a respective capacitor, and provides an evaluation signal VO1, VO2, ..., VOn, representative of the voltage that exists across the terminals of the capacitor.

Figure 3:
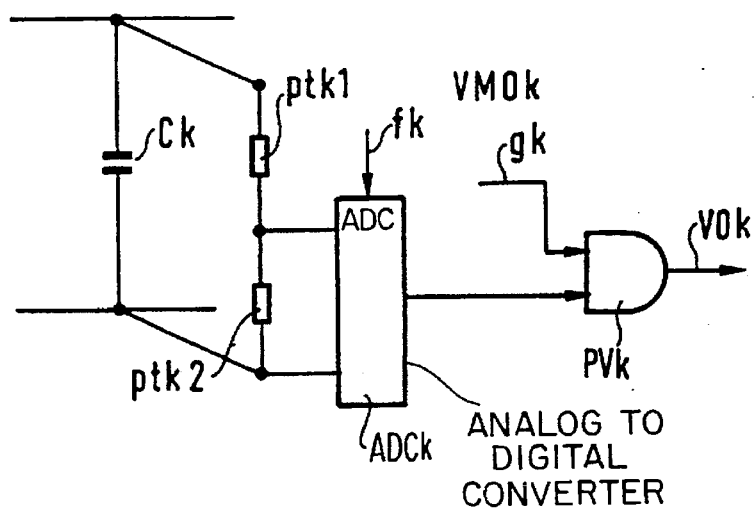
FIG. 3 is the circuit diagram of means for evaluating capacitor charge voltage and usable in the circuit of FIG. 2.

With reference to FIG. 3, it can be seen that an implementation of the evaluation circuit comprises impedances ptk1 and ptk2 connected in series across the terminals of capacitor Ck, and delivering a determined fraction of the voltage across the terminals of the capacitor to an analog-to-digital converter ADC which responds to each pulse fk by delivering a digital voltage value which is read by a gate circuit PVk triggered by a signal gk. The signals fk and gk are advantageously produced by a time base BT (FIG. 2).

According to the invention, each of the capacitors is also associated with a respective difference-measuring circuit VE1, VE2, ..., VEn measuring the difference, if any, between the observed charge voltage as received from the corresponding evaluation circuit and the nominal charge voltage of the capacitor. The difference-measuring circuit itself calculates the nominal charge voltage of the capacitor, which is the fraction 1/n of the voltage VE of the voltage source SE multiplied by the rank R of the stage, n being the number of stages in the converter. This circuit thus receives the values VE and R, while the value n which is constant for the converter as a whole is hard-wired in each circuit (the value R is constant for each stage and could likewise be hard-wired). It derives therefrom the nominal charge voltage VExR/n and it compares it with the evaluated charge voltage to provide a difference signal VEC1, VEC2, ..., VECn, representative of the difference between said two voltages. The difference signal may be a simple logic signal (on two bits) representing solely the presence of a difference and its sign. Advantageously, for reasons explained below, a difference signal is delivered if the capacitor charge difference exceeds a predetermined threshold which is hard-wired in the difference-measuring circuit.

The control means of FIG. 2 also include control modules MC1, MC2, ..., MCn operating in response to trigger signals sd1, sd2, ..., sdn. On each period of the converter, the time base BT produces a signal sd which directly constitutes the signal sd1, and which also produces the time-offset signals sd2, ..., sdn by means of delay units R2, ..., Rn. The function of the control modules MC1, MC2, ..., MCn is essentially to produce control pulses during each converter period for the purpose of activating signals CT1, CT2, ..., CTn that control the switches of the converter. In each case, the nominal duration of each such pulse is mainly determined by the value VE of the voltage provided by the voltage source and by the voltage level to be delivered to the current source. This aspect of the operation of the converter is not described in greater detail since it lies outside the field of the present invention.

Each of these active-level control pulses is applied directly to a respective one of the switches T'1, T'2, ..., T'n, to cause it to be non-conductive, and each pulse is also delivered to a respective NOR gate pe1, pe2, ..., pen that then delivers the opposite or "inactive" level to cause the respective switches T1, T2, ..., Tn to be conductive, and regardless of the level on the other input of the NOR gate.

During normal operation of the converter, the states of the two switches in each pair T1, T'1; T2, T'2; ...; Tn, T'n are therefore always opposite, as mentioned above.

In addition, according to the invention, the converter includes control means, essentially situated in the time base BT in the embodiment of FIG. 2, continuously receiving an evaluation of said voltage of the converter voltage source in the form of the difference signal VECn, and as soon as this voltage drops below a given threshold, it suspends said nominal operation of the converter.

Since the signal VECn relates to the charge voltage of capacitor Cn, it simultaneously relates to the voltage of the voltage source. In practice, either this voltage is present at its nominal value and nominal operation of the converter is to be implemented, or else this voltage is not present at its nominal value, being at a value such that on returning to normal, and without the invention, the operating voltage of the switches could be exceeded, in which case normal operation of the converter must not continue; this can be seen more clearly below.

Thus, when the time base BT observes that the voltage of the voltage source is insufficient, it ceases to issue any signal sd and, instead, it delivers a DC signal at.

Because there is no signal sd, the signals CT1, CT2, ..., CTn remain in the inactive state, thereby causing the switches T'1, T'2, ..., T'n to be conductive.

The signal at enables waiting circuits DA1, DA2, ..., DAn-1 (not shown). Each of them observes the corresponding difference signal VEC1, VEC2, ..., and so long as the mean charge voltage of the corresponding capacitor is not such as to switch off the difference signal, the delay circuit supplies a charging control signal DR1', DR2', ..., to the corresponding gate pe2, ..., pen of the switching cell of immediately greater rank.

Thus, for each cell, so long as none of the capacitors is sufficiently charged, while the switch T'2, ..., T'n is already conductive, so is the switch T2, ..., Tn. With reference to FIG. 1, it can be seen clearly that all of the capacitors are thus connected in parallel to the terminals of the voltage source. As soon as the voltage of the voltage source becomes established, all of the capacitors therefore charge in parallel.

Thereafter, when capacitor C1 reaches its nominal charge, the difference signal VEC1 disappears, waiting circuit DA1 switches off the charging control signal DR'1, and switch T2 becomes non-conductive, thereby interrupting charging of capacitor C1, while charging continues for the other capacitors.

When capacitor C2 is in turn sufficiently charged, the corresponding difference signal VEC2 is switched off and the waiting circuit DA2 switches off the signal DR2', thereby causing a switch T3 (not shown) to cease conducting, and so on, until capacitor Cn-1 (not shown) is charged, thereby causing switch Tn to cease conducting.

Finally, when capacitor Cn is fully charged, the time base observes the difference signal VECn disappearing and switches off the DC signal at while also establishing nominal operation of the converter by producing a periodic signal sd.

It is clear that a variant of the above would be to compare not the charge voltages observed on the capacitors individually, each with a respective nominal charge voltage for the capacitor, but merely to compare the voltage of the voltage source with the various nominal charge voltages, which variant would be cheaper.

Naturally, the above is based on the assumption that the voltage of the voltage source is established sufficiently progressively to enable the operation described above to take place.

This assumption is usually true, since the source nearly always includes a filter that sets a limit on the slope with which current can be established. The source may also be an AC power supply main, and the time constants encountered are generally of the order of one-fourth of a period, i.e. 5 ms at 50 Hz, which is much longer than the operating period of the converter.

Finally, in accordance with the invention, it is possible, if necessary, to add time constant means so that the voltage of the voltage source is indeed established progressively in a manner appropriate for the converter used.

It is also desirable for the charge voltage of the capacitors in the converter to be evaluated as quickly as possible. The solution described with reference to FIG. 3 has the merit of enabling processing to be digital, but it is not very fast. It may be preferable to use an analog variant in which the voltage from the voltage divider bridge is compared with a reference voltage to actuate an electronic bistable.

It should also be mentioned that given drift in the various parameters of the circuit elements, it is desirable for the comparison between the observed capacitor charge voltage and the corresponding reference to include a margin of error in the form of a threshold, below which said difference signal is not issued.

Clearly the above descriptions are given purely by way of non-limiting example and the numerical values, in particular, may change for each application.

We claim:

1. A multilevel converter comprising, in particular, between a voltage source (SE) and a current source (C), a succession of controllable switching cells (CL1, CL2, ..., CLn), each having two switches (T1, T'1; T2, T'2; ... ; Tn, T'n), with one pole of each of the two switches forming part of a pair of upstream poles and with the other pole of each of the switches forming one of a pair of downstream poles, the pair of downstream poles of an upstream cell being connected to the pair of upstream poles of a downstream cell, and the pair of upstream poles of a first cell (CL1) being connected to said current source (C) while the pair of downstream poles of a last cell (CLn) is connected to said voltage source (SE), the converter further comprising a capacitor (C1, C2, ..., Cn) for each cell, except that the capacitor of the last cell may be omitted when said voltage source (SE) is suitable for performing the same role, each capacitor being connected between the two poles constituting the pair of downstream poles of the corresponding cell, the converter also comprising control means governing the nominal operation of the converter by acting on the switches of successive cells in such a manner that the two switches of any given cell are always in respective opposite conduction states, such that in response to a cell control signal (CT1, CT2, ..., CTn) provided by said control means, one of the two switches in a given cell is successively in a first conduction state and then in a second conduction state during a cyclically repeated period, and such that in response to cell control signals that are identical but offset in time by a fraction of said period the switches of successive cells operate respectively in the same manner but offset in time by said fraction of a period, the successive capacitors (C1, C2, ..., Cn) having respective increasing nominal charge voltages, the nominal charge voltage of the capacitor in each of said cells being equal to the product of a voltage (VE) from said voltage source (SE) multiplied by the reciprocal of the number of cells and by the rank of the cell, the converter being characterized in that it comprises control means (BT, DA1, ..., DAn, pe2, ..., pen) organized to evaluate said voltage of the voltage source of the converter (VECn) and as soon as it is less than a determined threshold, to suspend said nominal operation of the converter (sd) and to act on said switches (T1, T'1; T2, T'2, ... ; Tn, T'n) in such a manner that while said voltage (VE) of the voltage source (SE) has a value lying between zero and a lowest one of said nominal charge voltages, it charges all of the capacitors of the converter, while said voltage of the voltage source exceeds said lowest nominal charge voltage the capacitor (C1) nominally charged to said voltage is taken out of circuit and said voltage of the voltage source continues to charge the capacitors (C2, ..., Cn) requiring higher nominal charge voltages, while the voltage of the voltage source exceeds the immediately higher nominal charge voltage the capacitor (C2) nominally charged to said voltage is in turn taken out of circuit, with the voltage of the voltage source continuing to charge the other capacitors, and so on, until all of the capacitors of the converter are charged to their respective nominal charge voltages, after which said control means establish said nominal operation of the converter.

2. A converter according to claim 1, characterized in that said control means (BT, DA2, ..., DAn, pe2, ..., pen) act on said switches so that for a voltage of the voltage source that is increasing from zero, both switches are initially closed simultaneously in all of the cells (T1, T'1; T2, T'2; . .. ; Tn, T'n), with the exception of the switches of the first cell (T1, T'1) which are in another state such that the voltage delivered to said load is zero, after which, as said voltage of the voltage source rises, the pairs of switches of successive following cells (T2, T'2; ... ; Tn, T'n) are put into said other state, cell after cell.

3. An installation making use of a converter according to claim 1, characterized in that it is organized, where necessary, so that said establishment of the voltage of the voltage source takes place progressively in a manner appropriate to the converter used.

* * * * *